(12) United States Patent
Nam et al.

(10) Patent No.: US 10,659,814 B2
(45) Date of Patent: May 19, 2020

(54) DEPTH PICTURE CODING METHOD AND DEVICE IN VIDEO CODING

(71) Applicant: LG ELECTRONICS INC., Seoul (KR)

(72) Inventors: Junghak Nam, Seoul (KR); Sehoon Yea, Seoul (KR); Jungdong Seo, Seoul (KR); Sunmi Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 15/319,335

(22) PCT Filed: Sep. 25, 2015

(86) PCT No.: PCT/KR2015/010142
§ 371 (c)(1),
(2) Date: Dec. 15, 2016

(87) PCT Pub. No.: WO2016/056782
PCT Pub. Date: Apr. 14, 2016

(65) Prior Publication Data
US 2017/0150178 A1    May 25, 2017

Related U.S. Application Data

(60) Provisional application No. 62/061,150, filed on Oct. 8, 2014.

(51) Int. Cl.
*H04N 19/597*    (2014.01)
*H04N 19/17*    (2014.01)
(Continued)

(52) U.S. Cl.
CPC ......... *H04N 19/597* (2014.11); *H04N 19/124* (2014.11); *H04N 19/17* (2014.11);
(Continued)

(58) Field of Classification Search
CPC ........................... H04N 19/597; H04N 19/124
See application file for complete search history.

(56) References Cited

U.S. PATENT DOCUMENTS

| | | | |
|---|---|---|---|
| 2013/0176390 A1 | 7/2013 | Chen et al. | |
| 2014/0176674 A1* | 6/2014 | Kang | H04N 19/597 |
| | | | 348/43 |

(Continued)

FOREIGN PATENT DOCUMENTS

| | | |
|---|---|---|
| CN | 102017627 A | 4/2011 |
| CN | 102340666 A | 2/2012 |

(Continued)

OTHER PUBLICATIONS

Feng Zou, Dong Tia, 3D-CE1.h: On reference view selection in NBDV and VSP, Joint Collaborative Team on 3D Video Coding Extensions of ITU-T SG 16 WP 3 and ISO/IEC JTC 1/SC 29/WG 11.

(Continued)

*Primary Examiner* — William C Vaughn, Jr.
*Assistant Examiner* — Jerry T Jean Baptiste
(74) *Attorney, Agent, or Firm* — Dentons US LLP

(57) ABSTRACT

The present invention relates to 3D video coding device and method. A decoding method, according to the present invention, provides a 3D video decoding method. A decoding method comprises the steps of: obtaining a disparity value on the basis of a reference view and a predetermined value; deriving movement information of a current block in a depth picture on the basis of the disparity value; and generating a prediction sample of the current block on the basis of the movement information, wherein the reference view is a view of a reference picture in a reference picture list. According to the present invention, even when a base view cannot be accessed, a disparity vector can be derived on the basis of an (Continued)

available reference view index in a decoded picture buffer (DPB), and coding efficiency can be enhanced.

4 Claims, 10 Drawing Sheets

(51) Int. Cl.
   *H04N 19/124* (2014.01)
   *H04N 19/172* (2014.01)
   *H04N 19/44* (2014.01)
   *H04N 19/51* (2014.01)

(52) U.S. Cl.
   CPC ........... *H04N 19/172* (2014.11); *H04N 19/44* (2014.11); *H04N 19/51* (2014.11)

(56) References Cited

U.S. PATENT DOCUMENTS

| | | | |
|---|---|---|---|
| 2014/0198850 A1 | 7/2014 | Choi et al. | |
| 2014/0211856 A1 | 7/2014 | Sugio et al. | |
| 2014/0240456 A1* | 8/2014 | Kang | H04N 19/597 348/42 |
| 2014/0241434 A1 | 8/2014 | Lin et al. | |
| 2014/0267605 A1 | 9/2014 | Thirumalai et al. | |
| 2014/0286423 A1 | 9/2014 | Chen et al. | |
| 2015/0030087 A1* | 1/2015 | Chen | H04N 19/597 375/240.27 |
| 2016/0165241 A1* | 6/2016 | Park | H04N 19/103 375/240.08 |

FOREIGN PATENT DOCUMENTS

| | | |
|---|---|---|
| CN | 103430549 A | 12/2013 |
| CN | 103597837 A | 2/2014 |
| CN | 103916658 A | 7/2014 |
| RU | 2519057 C2 | 6/2014 |
| WO | 2013/128832 A1 | 9/2013 |
| WO | 2014005467 A1 | 1/2014 |

OTHER PUBLICATIONS

Gerhard Tech, 3D-CE1.h: 3D-HEVC Draft Text 5, Joint Collaborative Team on 3D Video Coding Extensions of ITU-T SG 16 WP 3 and ISO/IEC JTC 1/SC 29/WG 11, Poznan University of Technology.

LG Electronics; "Modification of reference index for depth disparity derivation", Joint Collaborative Team on 3D Video Coding Extensions of ITU-T SG 16 WP 3 and ISO/IEC JTC 1/SC 29/WG 11, JCT3V-J0046, Jul. 3-9, 2014.

LGE USA: "JCT-3V AHG Report: 3D-AVC Software Integration (AHG3)", JCT3V-I0003, Joint Collaborative Team on 3D Video Coding Extension of ITU-T SG16 WP3 and ISO/IEC JTC1/SC29/WG11, 9th Meeting, Sapporo, JP, Jul. 3-9, 2014.

LGE: "Results on Weighted Prediction in 3D Video Coding", JCT3V-B0134r4, Joint Collaborative Team on 3D Video Coding Extension Development of ITU-T SG16 WP3 and ISO/IEC JTC1/SC29/WG11, 2nd Meeting, Shanghai, CN, Oct. 13-19, 2012.

Okubo, et al.: "H.264/AVC Textbook", Impress R&D, Jan. 1, 2009.

JCT3V-K1001-v4: "3D-HEVC Draft Text 7," Joint Collaborative Team on 3D Video Coding Extensions of ITU-T SG 16 WP 3 and ISO/IEC JTC 1/SC 29/WG 11, 11th Meeting: Geneva, CH, Feb. 12-18, 2015, pp. 1-121.

* cited by examiner

FIG. 5
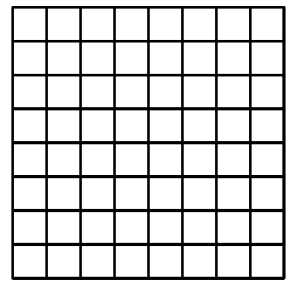
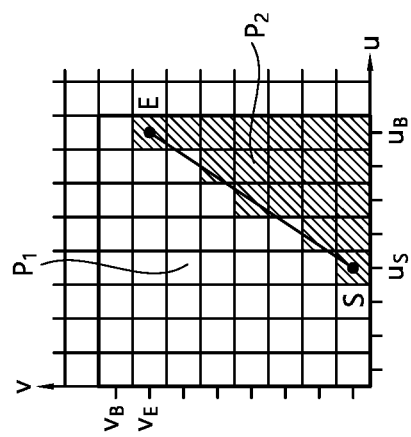
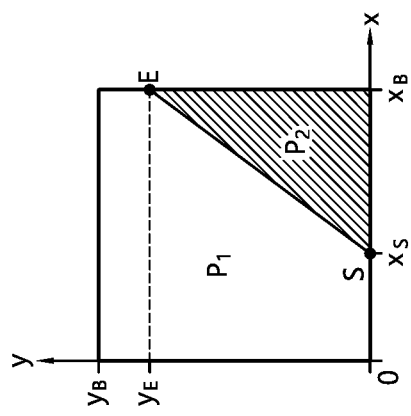

DEPTH PICTURE CODING METHOD AND DEVICE IN VIDEO CODING

CROSS-REFERENCE TO RELATED APPLICATIONS

This application is the National Stage filing under 35 U.S.C. 371 of International Application No. PCT/KR2015/010142, filed on Sep. 25, 2015, which claims the benefit of U.S. Provisional Application No. 62/061,150 filed on Oct. 8, 2014, the contents of which are all hereby incorporated by reference herein in their entirety.

BACKGROUND OF THE INVENTION

Field of the Invention

The present invention relates to a technology associated with video coding, and more particularly, to a method and a device for coding a depth picture in video coding.

Related Art

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, a 3D video using multi-views have a high correlation between views having the same picture order count (POC). Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for coding/decoding a multi-view video, and information need for coding and/or decoding of a current view can be obtained. For example, a block to be decoded in a current view can be predicted or decoded with reference to a block in another view.

Further, since the depth picture and the texture picture contain information on the same scene, the depth picture and the texture picture have a high correlation with each other. Accordingly, the depth picture may be predicted or decoded by referring to the texture picture.

SUMMARY OF THE INVENTION

The present invention provides a method and apparatus for predicting a current block in 3 dimensional (3D) video coding.

The present invention provides a method and a device for performing an inter-view motion prediction (IMVP).

The present invention provides a method and a device for setting an available reference view in performing the IMVP.

The present invention provides a method and a device for inducting a disparity of a current block in depth picture coding.

The present invention provides a method and a device for setting a reference view index used for inducting the disparity of the current block.

In an aspect, a method for decoding a 3D video is provided. The decoding method includes: obtaining a disparity value on the basis of a reference view and a predetermined value; deriving movement information of a current block in a depth picture on the basis of the disparity value; and generating a prediction sample of the current block on the basis of the movement information, wherein the reference view is a view of a reference picture in a reference picture list.

In another aspect, a device for decoding a 3D video is provided. The decoding device includes: a decoder receiving a bitstream including prediction mode information; and a predictor obtaining a disparity value on the basis of a reference view and a predetermined value; deriving motion information of a current block in a depth picture on the basis of the disparity value, and generating a prediction sample of the current block on the basis of the motion information, wherein the reference view is a view of a reference picture in a reference picture list.

According to the present invention, a disparity vector of a current block can be smoothly induced in 3D video coding.

According to the present invention, even when a base view cannot be accessed, the disparity vector can be induced based on an available reference view index in a decoded picture buffer (DPB) and coding efficiency can be enhanced.

BRIEF DESCRIPTION OF THE DRAWINGS

FIG. 5 is s diagram schematically illustrating a Wedgelet mode.

DESCRIPTION OF EXEMPLARY EMBODIMENTS

Figure 1:
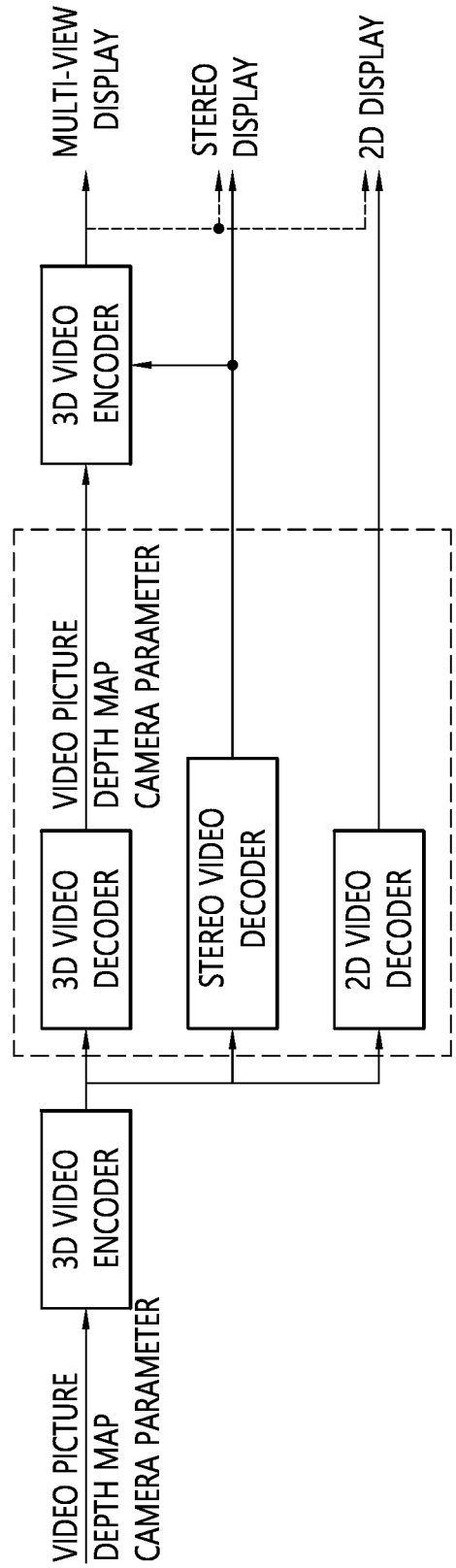
FIG. 1 briefly illustrates a 3 dimensional (3D) video encoding and decoding process to which the present invention is applicable.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, a picture generally means a unit representing one image in a specific time band and a slice is a unit constituting a part of the picture in coding. One picture may be constituted by a plurality of slices and as necessary, the picture and the slice may be mixedly used.

A pixel or a pel may mean a minimum unit constituting one picture (or image). Further, a 'sample' may be used as a term representing a value of a specific pixel. The sample may generally indicate a value of the pixel, may represent only a pixel value of a luma component, and may represent only a pixel value of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a 3 dimensional (3D) video encoding and decoding process to which the present invention is applicable.

Referring to FIG. 1, a 3D video encoder may encode a video picture, a depth map, and a camera parameter to output a bitstream.

The depth map may be constructed of distance information (depth information) between a camera and a subject with respect to a picture of a corresponding video picture (texture picture). For example, the depth map may be an image obtained by normalizing depth information according to a bit depth. In this case, the depth map may be constructed of depth information recorded without a color difference representation. The depth map may be called a depth map picture or a depth picture.

In general, a distance to the subject and a disparity are inverse proportional to each other. Therefore, disparity information indicating an inter-view correlation may be derived from the depth information of the depth map by using the camera parameter.

A bitstream including the depth map and the camera parameter together with a typical color image, i.e., a video picture (texture picture), may be transmitted to a decoder through a network or a storage medium.

From a decoder side, the bitstream may be received to reconstruct a video. If a 3D video decoder is used in the decoder side, the 3D video decoder may decode the video picture, the depth map, and the camera parameter from the bitstream. Views required for a multi-view display may be synthesized on the basis of the decoded video picture, depth map, and camera parameter. In this case, if a display in use is a stereo display, a 3D image may be displayed by using pictures for two views among reconstructed multi-views.

If a stereo video decoder is used, the stereo video decoder may reconstruct two pictures to be incident to both eyes from the bitstream. In a stereo display, a stereoscopic image may be displayed by using a view difference or disparity of a left image which is incident to a left eye and a right image which is incident to a right eye. When a multi-view display is used together with the stereo video decoder, a multi-view may be displayed by generating different views on the basis of reconstructed two pictures.

If a 2D decoder is used, a 2D image may be reconstructed to output the image to a 2D display. If the 2D display is used but the 3D video decoder or the stereo video decoder is used as the decoder, one of the reconstructed images may be output to the 2D display.

In the structure of FIG. 1, a view synthesis may be performed in a decoder side or may be performed in a display side. Further, the decoder and the display may be one device or may be separate devices.

Although it is described for convenience in FIG. 1 that the 3D video decoder and the stereo video decoder and the 2D video decoder are separate decoders, one decoding device may perform all of the 3D video decoding, the stereo video decoding, and the 2D video decoding. Further, the 3D video decoding device may perform the 3D video decoding, the stereo video decoding device may perform the stereo video decoding, and the 2D video decoding device may perform the 2D video decoding. Further, the multi-view display may output the 2D video or may output the stereo video.

Figure 2:
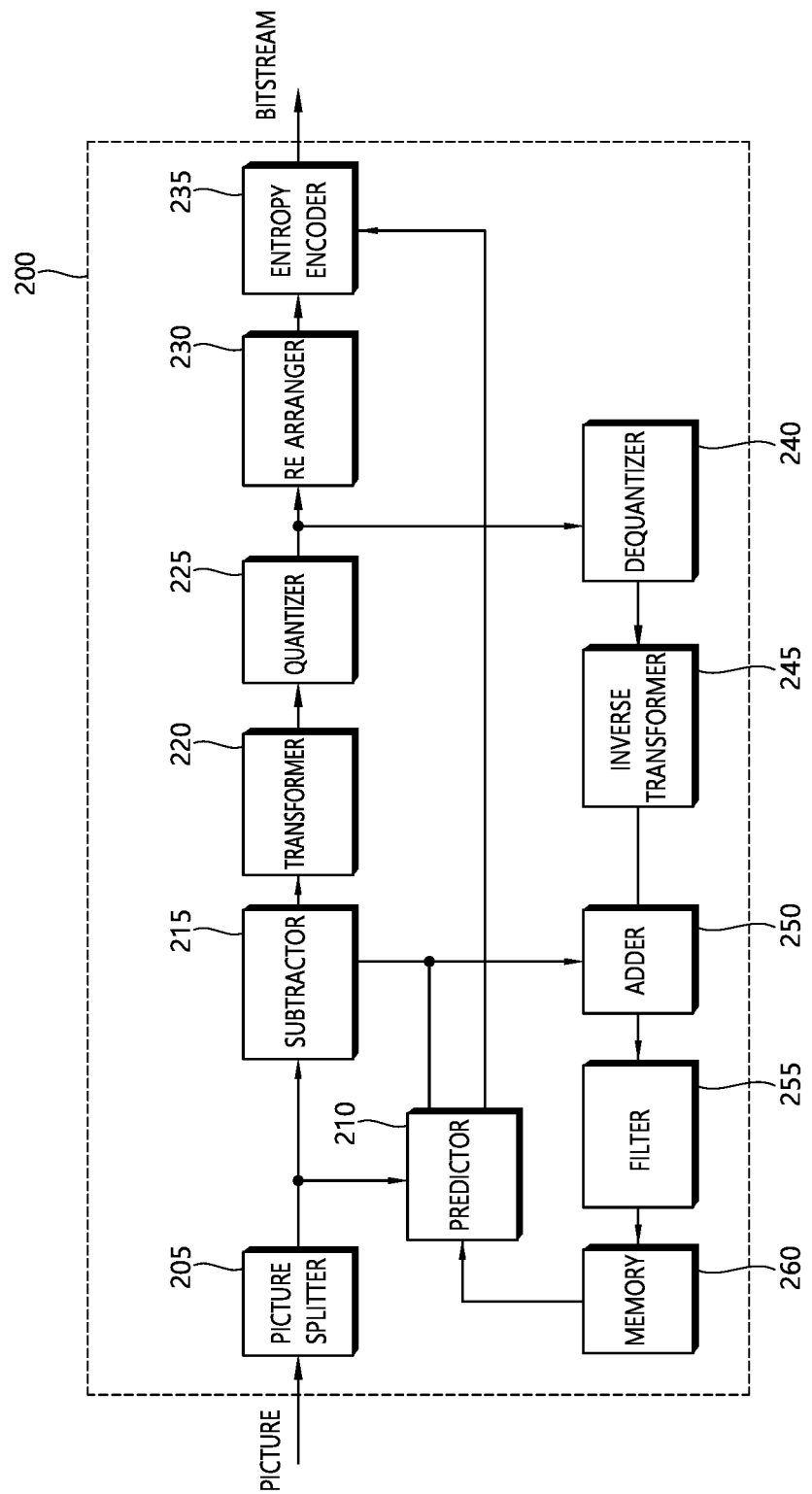
FIG. 2 briefly illustrates a structure of a video encoding device to which the present invention is applicable.

FIG. 2 briefly illustrates a structure of a video encoding device to which the present invention is applicable.

Referring to FIG. 2, a video encoding device 200 includes a picture splitter 205, a predictor 210, a subtractor 215, a transformer 220, a quantizer 225, a re-arranger 230, an entropy encoder 235, a dequantizer 240, an inverse transformer 245, an adder 250, a filter 255, and a memory 260.

The picture splitter 205 may split an input picture into at least one processing unit block. In this case, the processing unit block may be a coding unit block, a prediction unit block, or a transform unit block. As a unit block of coding, the coding unit block may be split from a largest coding unit block according to a quad-tree structure. As a block partitioned from the coding unit block, the prediction unit block may be a unit block of sample prediction. In this case, the prediction unit block may be divided into sub blocks. The transform unit block may be split from the coding unit block according to the quad-tree structure, and may be a unit block for deriving according to a transform coefficient or a unit block for deriving a residual signal from the transform coefficient.

Hereinafter, the coding unit block may be called a coding block (CB) or a coding unit (CU), the prediction unit block may be called a prediction block (PB) or a prediction unit (PU), and the transform unit block may be called a transform block (TB) or a transform unit (TU).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 210 may perform prediction on a processing target block (hereinafter, a current block), and may generate a prediction block including prediction samples for the current block. A unit of prediction performed in the predictor 210 may be a coding block, or may be a transform block, or may be a prediction block.

The predictor 210 may determine whether intra prediction is applied or inter prediction is applied to the current block. For example, the predictor 210 may determine whether the intra prediction or the inter prediction is applied in unit of CU.

In case of the intra prediction, the predictor 210 may derive a prediction sample for the current block on the basis of a reference sample outside the current block in a picture to which the current block belongs (hereinafter, a current picture). In this case, the predictor 210 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode, and the case (ii) may be called a directional mode. The predictor 210 may determine the prediction mode to be applied to the current block by using the prediction mode applied to the neighboring block.

In case of the inter prediction, the predictor 210 may derive the prediction sample for the current block on the basis of a sample specified by a motion vector on a reference picture. The predictor 210 may derive the prediction sample for the current block by applying any one of a skip mode, a merge mode, and a motion vector prediction (MVP) mode. In case of the skip mode and the merge mode, the predictor 210 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter prediction, the neighboring block includes a spatial neighboring block existing in the current picture and a temporal neighboring block existing in the reference picture. The reference picture including the temporal neighboring block may also be called a collocated picture (colPic). Motion information may include the motion vector and the reference picture. If the motion information of the temporal neighboring block is used in the skip mode and the merge mode, a top picture on a reference picture list may be used as the reference picture.

A multi-view may be divided into an independent view and a dependent view. In case of encoding for the independent view, the predictor 210 may perform not only inter prediction but also inter-view prediction.

The predictor 210 may configure the reference picture list by including pictures of different views. For the inter-view prediction, the predictor 210 may derive a disparity vector. Unlike in the motion vector which specifies a block corresponding to the current block in a different picture in the current view, the disparity vector may specify a block corresponding to the current block in another view of the same access unit (AU) as the current picture. In the multi-view, for example, the AU may include video pictures and depth maps corresponding to the same time instance. Herein, the AU may mean a set of pictures having the same picture order count (POC). The POC corresponds to a display order, and may be distinguished from a coding order.

The predictor 210 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view.

For example, the predictor 210 may add, to the merging candidate list, an inter-view merging candidate (IvMC) corresponding to temporal motion information of a reference view, an inter-view disparity vector candidate (IvDC) corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 210 may predict the motion vector of the current block on the basis of the disparity vector by applying the inter-view motion vector prediction. In this case, the predictor 210 may derive the disparity vector on the basis of a conversion of a largest depth value in a corresponding depth block. When a position of a reference sample in a reference view is specified by adding the disparity vector to a sample position of the current block in the reference view, a block including the reference sample may be used as a reference block. The predictor 210 may use the motion vector of the reference block as a candidate motion parameter of the current block or a motion vector predictor candidate, and may use the disparity vector as a candidate disparity vector for a disparity compensated prediction (DCP).

The subtractor 215 generates a residual sample which is a difference between an original sample and a prediction sample. If the skip mode is applied, the residual sample may not be generated as described above.

The transformer 220 transforms a residual sample in unit of a transform block to generate a transform coefficient. The quantizer 225 may quantize the transform coefficients to generate a quantized transform coefficient.

The re-arranger 230 re-arranges the quantized transform coefficients. The re-arranger 230 may re-arrange the quantized transform coefficients having a block shape in a 1D vector form by using a scanning method.

The entropy encoder 235 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 235 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The adder 250 adds the residual sample and the prediction sample to reconstruct the picture. The residual sample and the prediction sample may be added in unit of blocks to generate a reconstruction block. Although it is described herein that the adder 250 is configured separately, the adder 250 may be a part of the predictor 210.

The filter 255 may apply deblocking filtering and/or a sample adaptive offset to the reconstructed picture. An artifact of a block boundary in the reconstructed picture or a distortion in a quantization process may be corrected through the deblocking filtering and/or the sample adaptive offset. The sample adaptive offset may be applied in unit of samples, and may be applied after a process of the deblocking filtering is complete.

The memory 260 may store the reconstructed picture or information required for encoding/decoding. For example, the memory 260 may store (reference) pictures used in inter prediction/inter-view prediction. In this case, pictures used in the inter prediction/inter-view prediction may be designated by a reference picture set or a reference picture list.

Although it is described herein that one encoding device encodes an independent view and a dependent view, this is for convenience of explanation. Thus, a separate encoding device may be configured for each view, or a separate internal module (e.g., a prediction module for each view) may be configured for each view.

Figure 3:
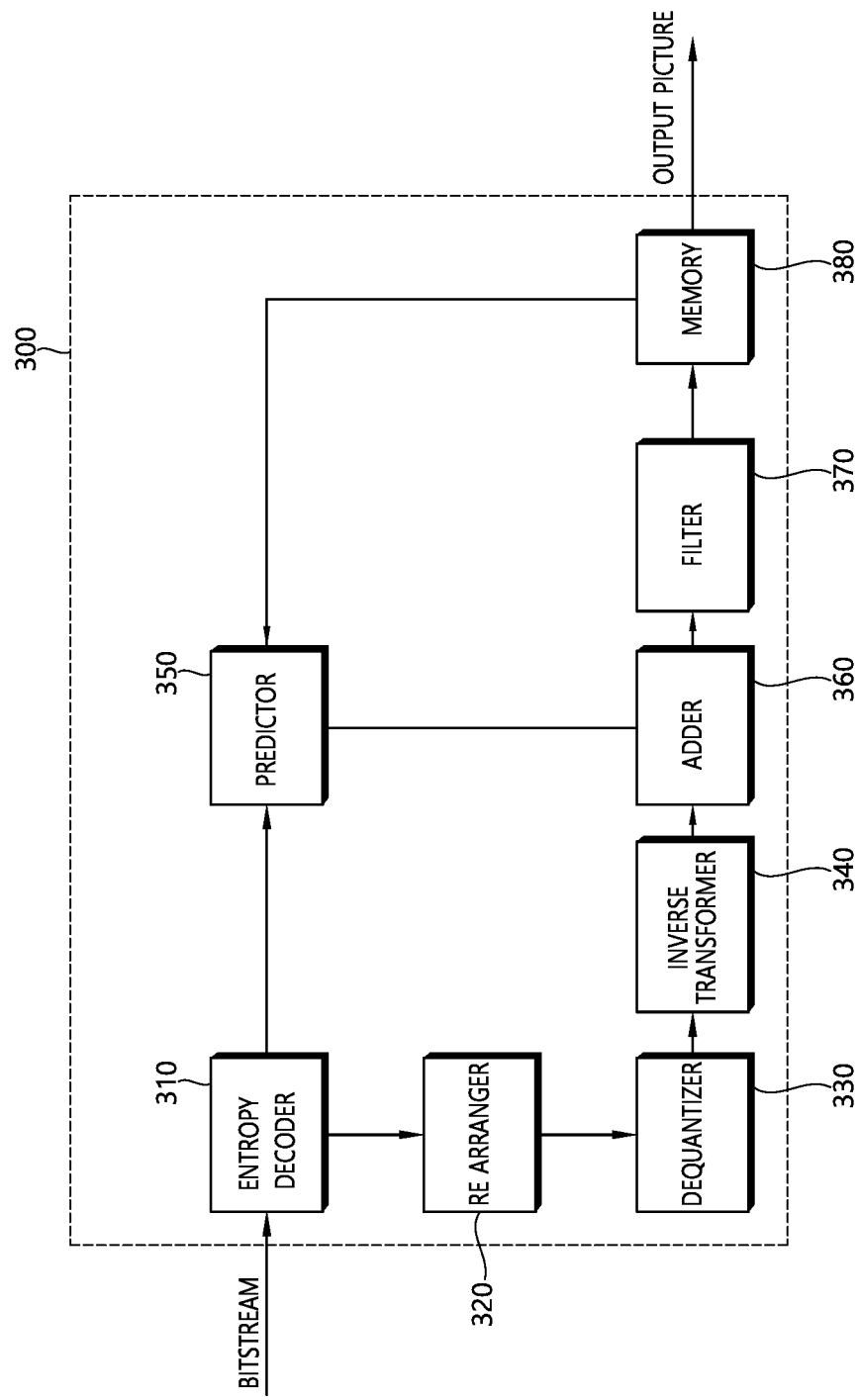
FIG. 3 briefly illustrates a structure of a video decoding device to which the present invention is applicable.

FIG. 3 briefly illustrates a structure of a video decoding device to which the present invention is applicable.

Referring to FIG. 3, a video decoding device 300 includes an entropy decoder 310, a re-arranger 320, a dequantizer 330, an inverse transformer 340, a predictor 350, an adder 360, a filter 370, and a memory 380.

When a bitstream including video information is input, the video decoding device 300 may reconstruct a video in association with a process by which video information is processed in the video encoding device.

For example, the video decoding device 300 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 310 may parse the bitstream to output information required for video reconstruction or picture reconstruction. For example, the entropy decoder 310 may decode information in the bitstream on the basis of a coding method such as exponential Golomb encoding, CAVLC, CABAC, or the like, and may output a value of a syntax element required for video reconstruction and a quantized value of a transform coefficient regarding a residual.

If a plurality of views are processed to reproduce a 3D video, the bitstream may be input for each view. Alternatively, information regarding each view may be multiplexed in the bitstream. In this case, the entropy decoder 310 may de-multiplex the bitstream to parse it for each view.

The re-arranger 320 may re-arrange quantized transform coefficients in a form of a 2D block. The re-arranger 320 may perform re-arrangement in association with coefficient scanning performed in an encoding device.

The dequantizer 330 may de-quantize the quantized transform coefficients on the basis of a (de)quantization parameter to output a transform coefficient. In this case, information for deriving a quantization parameter may be signaled from the encoding device.

The inverse transformer 340 may inverse-transform the transform coefficients to derive residual samples.

The predictor 350 may perform prediction on a current block, and may generate a prediction block including prediction samples for the current block. A unit of prediction performed in the predictor 350 may be a coding block or may be a transform block or may be a prediction block.

The predictor 350 may determine whether to apply intra prediction or inter prediction. In this case, a unit for determining which one will be used between the intra prediction and the inter prediction may be different from a unit for generating a prediction sample. In addition, a unit for generating the prediction sample may also be different in the inter prediction and the intra prediction. For example, which one will be applied between the inter prediction and the intra prediction may be determined in unit of CU. Further, for example, in the inter prediction, the prediction sample may be generated by determining the prediction mode in unit of PU, and in the intra prediction, the prediction sample may be generated in unit of TU by determining the prediction mode in unit of PU.

In case of the intra prediction, the predictor 350 may derive a prediction sample for a current block on the basis of a neighboring reference sample in a current picture. The predictor 350 may derive the prediction sample for the current block by applying a directional mode or a non-directional mode on the basis of the neighboring reference sample of the current block. In this case, a prediction mode to be applied to the current block may be determined by using an intra prediction mode of a neighboring block.

In case of the inter prediction, the predictor 350 may derive the prediction sample for the current block on the basis of a sample specified on a reference picture by a motion vector on the reference picture. The predictor 350 may derive the prediction sample for the current block by applying any one of a skip mode, a merge mode, and an MVP mode.

In case of the skip mode and the merge mode, motion information of the neighboring block may be used as motion information of the current block. In this case, the neighboring block may include a spatial neighboring block and a temporal neighboring block.

The predictor 350 may construct a merging candidate list by using motion information of an available neighboring block, and may use information indicated by a merge index on the merging candidate list as a motion vector of the current block. The merge index may be signaled from the encoding device. The motion information may include the motion vector and the reference picture. When motion information of the temporal neighboring block is used in the skip mode and the merge mode, a highest picture on the reference picture list may be used as the reference picture.

In case of the skip mode, unlike in the merge mode, a difference (residual) between the prediction sample and the original sample is not transmitted.

In case of the MVP mode, the motion vector of the current block may be derived by using the motion vector of the neighboring block as a motion vector predictor. In this case, the neighboring block may include a spatial neighboring block and a temporal neighboring block.

In case of the dependent view, the predictor 350 may perform inter-view prediction. In this case, the predictor 350 may configure the reference picture list by including pictures of different views.

For the inter-view prediction, the predictor 350 may derive a disparity vector. The predictor 350 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view. The camera parameter may be signaled from the encoding device.

When the merge mode is applied to the current block of the dependent view, the predictor 350 may add, to the merging candidate list, an IvMC corresponding to temporal motion information of a reference view, an IvDC corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 350 may predict the motion vector of the current block on the basis of the disparity vector by applying the inter-view motion vector prediction. In this case, the predictor 350 may use a block in a reference view specified by the disparity vector as a reference block. The predictor 350 may use the motion vector of the reference block as a candidate motion parameter or a motion vector predictor candidate of the current block, and may use the disparity vector as a candidate vector for disparity compensated prediction (DCP).

The adder 360 may add the residual sample and the prediction sample to reconstruct the current block or the current picture. The adder 360 may add the residual sample and the prediction sample in unit of blocks to reconstruct the current picture. When the skip mode is applied, a residual is not transmitted, and thus the prediction sample may be a reconstruction sample. Although it is described herein that the adder 360 is configured separately, the adder 360 may be a part of the predictor 350.

The filter 370 may apply de-blocking filtering and/or a sample adaptive offset to the reconstructed picture. In this case, the sample adaptive offset may be applied in unit of samples, and may be applied after de-blocking filtering.

The memory 380 may store a reconstructed picture and information required in decoding. For example, the memory 380 may store pictures used in inter prediction/inter-view prediction. In this case, pictures used in the inter prediction/inter-view prediction may be designated by a reference picture set or a reference picture list. The reconstructed picture may be used as a reference picture for a different picture.

Further, the memory 380 may output the reconstructed picture according to an output order. Although not shown, an output unit may display a plurality of different views to reproduce a 3D image.

Although it is described in the example of FIG. 3 that an independent view and a dependent view are decoded in one decoding device, this is for exemplary purposes only, and the present invention is not limited thereto. For example, each decoding device may operate for each view, and an internal module (for example, a prediction module) may be provided in association with each view in one decoding device.

Multi-view video coding may perform coding on a current picture by using decoding data of a different view belonging to the same access unit (AU) as the current picture to increase video coding efficiency for the current view.

In the multi-view video decoding, views may be coded in unit of AU, and pictures may be coded in unit of views. Coding is performed between views according to a determined order. A view which can be coded without a reference of another view may be called a base view or an independent view. Further, a view which can be coded with reference to an independent view or another view after the independent view is coded may be called a dependent view or an extended view. Further, if the current view is a dependent view, a view used as a reference in coding of the current view may be called a reference view. Herein, coding of a view includes coding of a texture picture, a depth picture, or the like belonging to the view.

Figure 4:
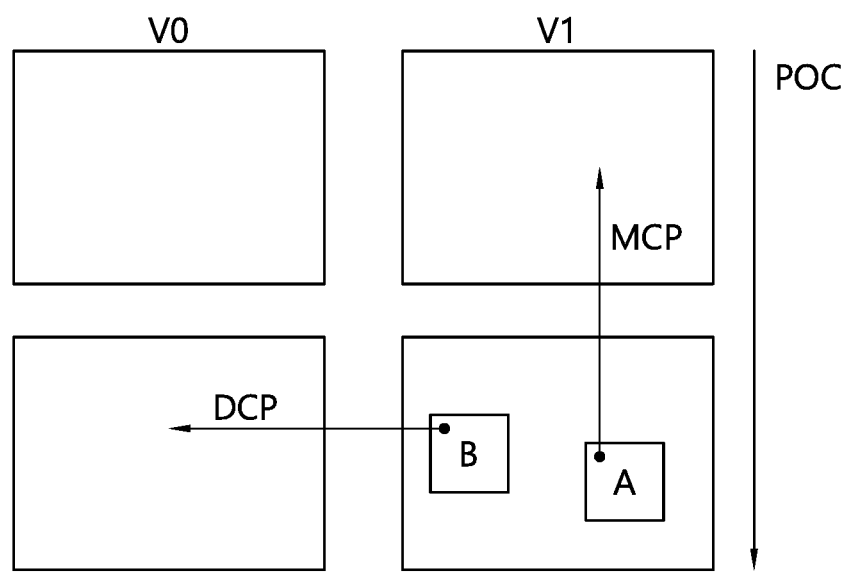
FIG. 4 is a diagram for schematically describing one example of multi-view video coding to which the present invention is applicable.

FIG. 4 is a diagram for schematically describing one example of multi-view video coding to which the present invention is applicable.

In the case of coding a multi-view video, pictures in which view IDs in one AU are different from each other and POCs are the same as each other are coded according to a pre-defined view coding order.

For example, as illustrated in FIG. 4, two views (views V0 and V1) are coded and the view coding order is assumed as the order of the views V0 and V1. In this case, V0 as the view which is coded first in the AU may be coded without referring to another view and the V0 becomes a base view or an independent view and V1 as the view which is coded next becomes a dependent view.

The base view is coded by referring the picture included in the base view without referring to another view. The dependent view is coded by referring to anther view which has already been coded while being coded next to the base view.

In the multi-view video coding, a CU which belongs to the dependent view may perform inter prediction by referring to the picture which has already been coded. In this case, a method that performs the prediction by referring to the pictures in which the view IDs are the same as each other is referred to as a motion compensated prediction (MCP) and a method that performs the prediction by referring to the pictures in which the view IDs in the same AU are different from each other is referred to as a disparity compensated prediction (DCP).

For example, referring to FIG. 4, block A may induce prediction samples by performing the MCP based on the motion vector by referring to a picture which belongs to the same view V1 thereas. Block B may induce the prediction samples by performing the DCP based on the disparity vector by referring to a picture of a different view V0 from the block B in the same AU. In coding the multi-view video, the picture of the different view may be used and the depth picture of the same view may be used.

For example, when the prediction samples are induced by performing the DCP, the disparity vector is added to a position (x, y) of a corresponding picture in the reference view corresponding to a position (x, y) of the prediction sample in the current block to determine the position of the reference sample of the corresponding picture in the reference view. The prediction sample may be induced based on the reference sample in the reference view. As one example, the disparity vector may have only an x-axis component. In this case, the disparity vector may be (disp, 0) and the position (xr, y) of the reference sample may be determined as (x+disp,y). Herein, disp represents a value of the disparity vector.

Meanwhile, the 3D video includes a texture picture having general color image information and a depth picture having depth information on the texture picture. In the 3D video, a plurality of texture pictures having different views in the same POC may exist and the depth pictures corresponding to the plurality of texture pictures, respectively may exist. Further, the plurality of texture pictures may be acquired from a plurality of cameras having different views.

The depth picture stores a distance which each pixel has as a gray scale and there are a lot of cases in which a minute depth difference between respective pixels is not large and the depth map may be expressed while being divided into two types of a foreground and a background in one block. Further, a depth map video shows a characteristic in that the depth map has a strong edge on a boundary of an object and has an almost constant value (e.g., a constant value) at a position other than the boundary.

The depth picture may be encoded and decoded by using intra prediction, motion compensation, disparity compensation, transform, and the like by a similar method to the texture picture. However, since the depth picture has a characteristic in that a change of a pixel value is not large and the depth picture has the strong edge, a new intra prediction mode to reflecting the characteristic of the depth picture may be used.

In the intra prediction mode for the depth picture, a block (alternatively, depth block) may be expressed as a model that partitions a block into two non-rectangular areas and each partitioned area may be expressed as the constant value.

As described above, the intra prediction mode to predict the depth picture by modeling the block in the depth picture is referred to as a depth modeling mode (DMM). In the DMM, the depth picture may be predicted based on partition information indicating how the block in the depth picture is partitioned and information indicating which value each partition is filled with.

For example, the DMM may be divided into a Wedgelet mode and a Contour mode.

FIG. 5 is s diagram schematically illustrating a Wedgelet mode.

Referring to FIG. 5, in the Wedgelet mode, two areas in the block (alternatively, the depth block and the current block) may be partitioned by a straight line. That is, the block may be partitioned into area P1 and area P2 by the straight line SE. In each of the partitioned areas, a prediction value may be generated as one constant value.

Figure 6:
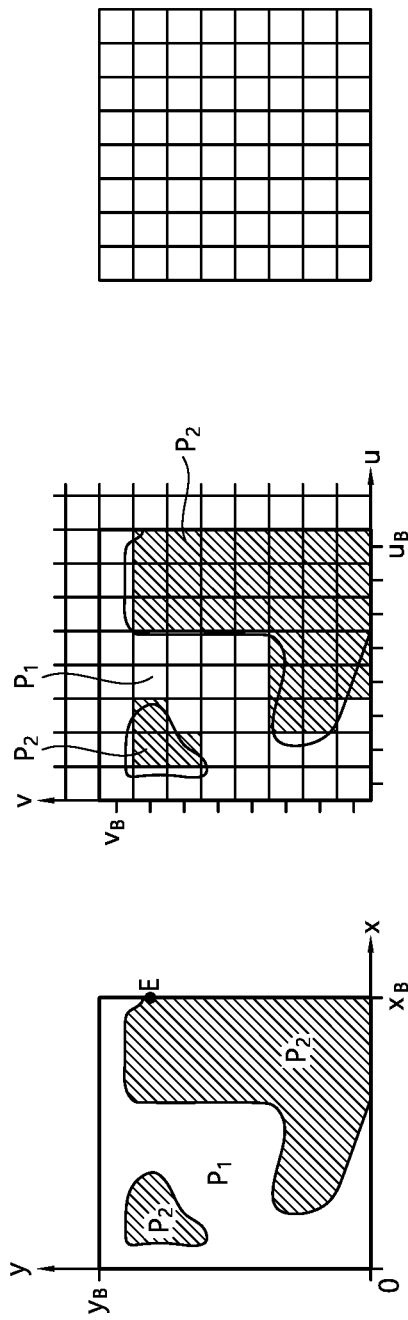
FIG. 6 is s diagram schematically illustrating a Contour mode.

FIG. 6 is s diagram schematically illustrating a Contour mode.

Referring to FIG. 6, in the Contour mode, two areas in the block (alternatively, the depth block and the current block) may be partitioned by a predetermined curve shape. In the Contour mode, two areas in the block may not be easily expressed by one geometric function and two areas may have predetermined shapes. Herein, as illustrated in FIG. 5, each area may be not one lump but a partitioned shape. In the Contour mode, the areas may be partitioned based on a corresponding block (texture block) in the texture picture corresponding the current block (depth block) in the depth picture. In the Contour mode, in each of the partitioned areas, the prediction value may be generated as one constant value.

After the prediction value for the block is generated, a residual representing a difference (alternatively, a residual signal) between an original sample and a prediction sample is calculated and the residual signal may be transmitted through transform and quantization, similarly to the intra prediction mode in the related art.

Meanwhile, a segment-wise DC coding (SDC) method may be used for the depth picture. In the SDC, the residual signal may be generated by using an average of the prediction values of the partitioned areas. In the SDC, residual data may be coded without the transform and quantization procedures. In general, the sample (pixel) values of the depth picture are not evenly distributed from a minimum value (e.g., 0) to a maximum value (e.g., 255), but are concentratively distributed in a specific area and have a characteristic in that a change of the value is not large by the unit of the block. A depth lookup table (DLT) is generated by considering such a characteristic and when coding is performed by converting a depth value of the depth picture into an index value of the depth lookup table by using the depth lookup table, the number of bits to be coded may be reduced. A residual block generated by using depth lookup table may be entropy-coded without the transform and quantization processes. That is, the SDC may be regarded as a residual coding method that transmits only a difference between an average brightness value of an original picture and the average brightness value of a prediction picture.

Hereinafter, the SDC method will be described in more detail.

The depth value of the depth picture is transmitted per sequence parameter set (SPS) or slice. In this case, the depth value of the depth picture may be transmitted based on the DLT. In this case, prediction for the SDC is performed by the unit of the CU or PU block.

For example, an average $DC_{pred}$ of depth values intra-predicted with respect to the respective partitioned areas in the current block (two areas in the case of the DMM and one area in the case of a planer mode) and an average $DC_{org}$ of an original depth value are calculated and the respective calculated average values are mapped to a value having a smallest error in the DLT to find each index value. In addition, instead of coding a difference value between the original depth value and the predicted depth value, a difference value $SDC_{residual}$ between the index for the average $DC_{org}$ of the original depth value mapped to the DLT and the index for the average $DC_{pred}$ of the predicted depth value may be coded. The SDC may be selectively used by flag information by the unit of the CU block. SDC mode information is transmitted to the block to which the SDC is applied. After the SDC mode information is transmitted, the difference value $SDC_{residual}$ between the index for the average $DC_{org}$ of the original depth value and the index for the average $DC_{pred}$ of the predicted depth value is transmitted.

Equation 1 given below shows a process that generates a difference index value for the current block by the SDC method.

$$SDC_{residual} = \text{Value2Idx}(DC_{org}) - \text{Value2Idx}(DC_{pred}) \quad \text{[Equation 1]}$$

In Equation 1, Value2Idx(x) represents an index having a value closest to an x value input in the DLT.

Figure 7:
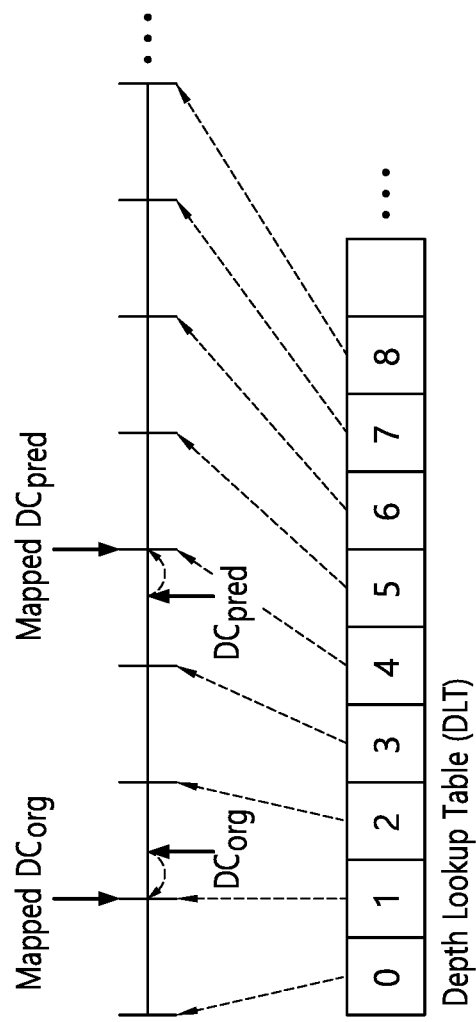
FIG. 7 is s diagram schematically illustrating an SDC coding method.

FIG. 7 is s diagram schematically illustrating an SDC coding method.

Referring to FIG. 7, $DC_{org}$ is acquired with respect to the original block to be coded, $DC_{pred}$ is acquired with respect to the prediction block generated by the intra prediction, and thereafter, each of $DC_{org}$ and $DC_{pred}$ is mapped to an index having a closest DLT value. In FIG. 6, $DC_{org}$ is mapped to DLT index 2 and $DC_{pred}$ is mapped to DLT index 4. Accordingly, during the coding process, 2 as a value corresponding to a difference between both DLT indexes is coded and transmitted. Meanwhile, a case where there is no index difference after mapping $DC_{org}$ and $DC_{pred}$ may frequently occur and a flag indicating whether the index difference exists may be first transmitted for efficient processing. In the case where a flag value is 0, the case means that there is no difference between $DC_{org}$ and $DC_{pred}$ and the decoder may generate a reconstructed image by using the average value $DC_{pred}$ of the prediction block. In the case where the flag value is 1, the case means that there is the difference between $DC_{org}$ and $DC_{pred}$ and in this case, the index difference value is transmitted. Since the index difference value may exist as a positive number of a negative number, each of a sign and a magnitude of the index difference value may be transmitted.

Meanwhile, in the case where the depth picture belongs to the dependent view, an inter-view motion prediction (IVMP) may be used, which derives motion information of the current block based on the motion information such as the motion vector which exists in the corresponding block of the reference view similarly to the texture picture.

Figure 8:
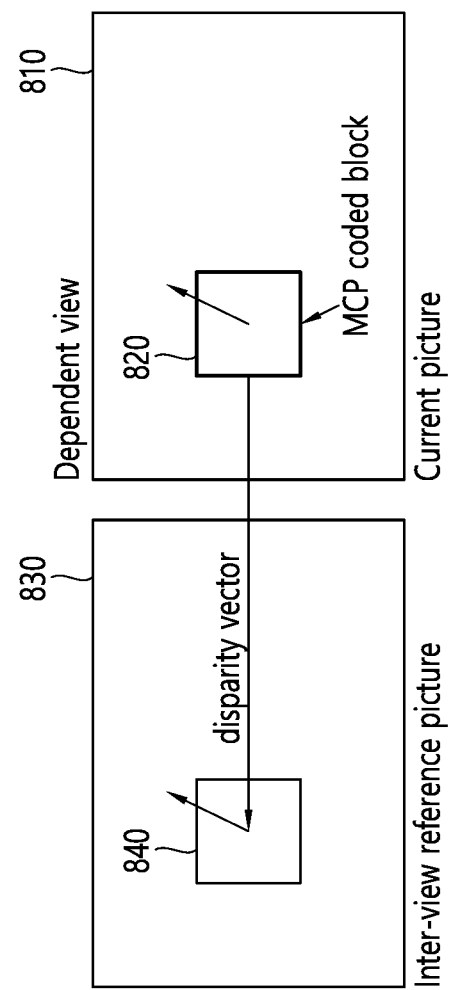
FIG. 8 is s diagram schematically illustrating an IVMP method.

FIG. 8 is s diagram schematically illustrating an IVMP method.

Referring to FIG. 8, it is assumed that a current block 820 in a current picture 810 is coded (encoded/decoded). Herein, the current picture 810 may be the depth picture. Further, herein, the current block 820 may be the prediction block and may be a block coded based on the MCP. In the case where the IVMP is applied, the motion information of the current block 820 may be derived based on the motion information of a corresponding block 840 in an inter-view reference picture 830. The corresponding block 840 may be induced based on the disparity vector.

According to the present invention, a signaling method for efficiently performing the intra prediction, disparity derivation, and SDC for the depth picture is provided.

In general, a range of the prediction unit PU used for the intra prediction may be determined by the encoder. However, the size of the PU which is actually predicted may vary depending on the size of the transform unit TU. That is, block information and a prediction mode are transmitted by the unit of the PU, but the intra prediction process is performed by the unit of the TU. Since a pixel of the neighboring block of the current block to be coded in the intra prediction, the prediction is performed according to the TU size apart from the PU size. That is, during the intra prediction process, the intra prediction is performed by using reconstructed neighboring samples of a TU-unit block. This is to increase compression and coding efficiency by using the reconstructed neighboring pixels. Accordingly, the size of the block in which the intra prediction is performed is limited by the TU size. On the contrary, since the transform and the quantization are not used in the SDC method, the prediction may be performed with respect to the PU regardless of the TU size. However, in some cases, the intra prediction for a block larger than the presented maximum TU size may be required in the encoder and to this end, even with respect to the block to which the SDC method is applied, it may be restricted so that a PU prediction is performed according to the TU size. Meanwhile, in the case of the DMM, the prediction may not be performed by partitioning the block even though the PU size is larger than the TU size due to the characteristic of the mode. Accordingly, when the PU size is larger than the TU size, it need to be restricted so that the DMM is not applied. A prediction process for a bock larger than the TU size set by the encoder may be excluded through such a restriction.

Meanwhile, as described above, the disparity vector is required for performing the IVMP for the current block of the current (depth) picture of the dependent view. Unlike the case where disparity vector from neighboring blocks (NBDV) or depth-oriented disparity vector derivation (DoNBDV) are used for the texture view or the texture picture, the disparity for the depth view or the depth picture may be induced from a neighboring decoded depth value or induced from a predetermined (depth) value. The predetermined (depth) value may be a middle value of a depth value range. Further, the predetermined value may be "1<<(bit depth−1)". Herein, the bit depth may be a bit depth set with respect to a luma sample.

In the IVMP, since the motion vector may be brought from the corresponding block of the reference view, the reference view for bring the motion vector needs to be considered when inducing the disparity vector. As one example, the reference view may not be fixed to the base view, but set to the view of the available reference picture in the reference picture list. Further, the reference view for inducting the disparity vector and the reference view for bringing the motion vector may be set to be the same as each other.

For example, the disparity vector may be induced as shown in Equation 2 given below.

$$\text{DispVec}[x][y] = (\text{DepthToDisparity}B[\text{DefaultRefView}Idx][1 << (\text{BitDepth}-1)], 0) \qquad \text{[Equation 2]}$$

Where, DepthToDisparityB[j][d] represents the horizontal component of a disparity vector between the current view and the view with ViewIdx equal j corresponding to the depth value d in the view with ViewIdx equal to j. That is, herein, DefaultRefViewIdx represents the index of the reference view for inducting the disparity vector. In this case, a reference view order index (RefViewIdx) of the reference view for bringing the motion vector may be the same as the DefaultRefViewIdx.

Meanwhile, as described above, according to the SDC, the difference index value for the current block is transmitted and in this case, the difference index value may be transmitted by two steps or immediately transmitted as a difference value. As one example, flag information indicating whether the index difference value exists may be first transmitted and when the flag value is 1, the index difference value may be transmitted. In this case, the difference value may not have 0. Accordingly, in this case, the sign for the index difference value may be continuously transmitted. As another example, the index difference value may be immediately transmitted without the flag information indicating whether the index difference value exists. In this case, the index difference value may have 0 and the sign for the index difference value may be transmitted only when the index difference value is not 0.

Figure 9:
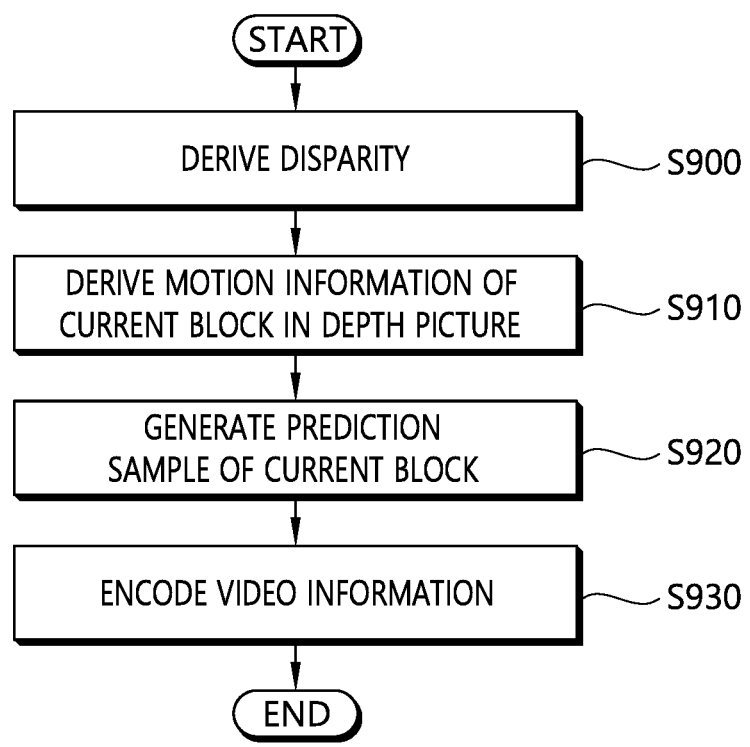
FIG. 9 is a flowchart schematically illustrating a method for encoding a 3D video according to an embodiment of the present invention.

FIG. 9 is a flowchart schematically illustrating a method for encoding a 3D video according to an embodiment of the present invention. The method of FIG. 9 may be performed by the video encoding device of FIG. 2.

Referring to FIG. 9, the encoding device derives the disparity vector (S900). The disparity vector may be disparity vector for the current block of the current picture of the depth view. The encoding device may derive the disparity vector from the neighboring decoded depth value or derive the disparity vector from a predetermined value as described above. The predetermined value may be the middle value of the depth value range. Further, the predetermined value may be "1<<(bit depth−1)". Herein, the bit depth may be the bit depth set with respect to the luma sample.

The encoding device derives the motion information for the current block (S910). The encoding device may search a block similar to the current block according to a motion information estimation procedure within a predetermined area of the reference picture and derive the motion information for the current block.

The encoding device creates the prediction sample for the current block (S920). The encoding device may reconstruct the current picture based on the prediction sample and the residual sample (signal) and the reconstructed picture may be used as the reference picture for coding another picture.

The encoding device may encode video information for video decoding (S930). The encoding device may entropy-encode the video information and output the entroy-encoded video information as the bitstream. The output bitstream may be transmitted through a network or stored in a storage medium. The vide information may include information (for example, prediction mode information and the residual signal) for reconstructing the current block. The video information may include values of syntax elements for reconstructing the current block.

Figure 10:
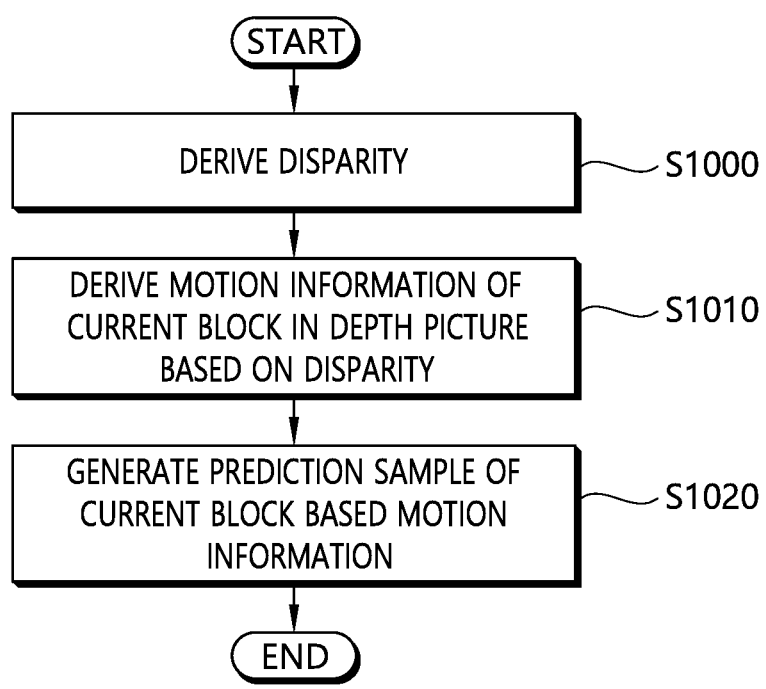
FIG. 10 is a flowchart schematically illustrating a method for decoding a 3D video according to an embodiment of the present invention.

FIG. 10 is a flowchart schematically illustrating a method for decoding a 3D video according to an embodiment of the present invention. The method of FIG. 10 may be performed by the video decoding device of FIG. 3.

Referring to FIG. 10, the decoding device derives the disparity vector (S700). The decoding device may entropy-decode the video information included in the bitstream and acquire the disparity value for the current block of the current picture in the depth view based on the reference view and a predetermined value.

The decoding device may derive the disparity vector from the neighboring decoded depth value or derive the disparity vector from the predetermined value as described above. The predetermined value may be the middle value of the depth value range. Further, the predetermined value may be "1<<(bit depth−1)". Herein, the bit depth may be the bit depth set with respect to the luma sample. The decoding device may derive the disparity vector based on Equation 2 given above.

The reference view may be the view of the reference picture in the reference picture list. As one example, the reference view may be the view of a first reference picture in the reference picture list.

The decoding device derives the motion information of the current block based on the disparity value (S1010). The decoding device may drive the motion information of the current block based on the IVMP method. In this case, the motion information of the current block may be derived based on the motion information of the corresponding block derived on the inter-view reference picture by using the disparity value. Herein, the motion information of the corresponding block may be used as the motion information of the current block. The motion information includes the motion vector. Herein, the view which belongs to the inter-view reference picture may be the same as the reference view.

The decoding device generates the prediction sample of the current block based on the motion information (S1020). The decoding device may generate the prediction sample of the current block based on the motion information and the reference picture in the depth view (current view). That is, the decoding device may generate the prediction sample based on the block derived based on the motion information on the reference picture in the depth view.

The decoding device may generate the residual sample for the current block from the received bitstream and reconstruct the current picture by inducting the reconstruction sample based on the generated prediction sample and residual sample. The sample may be reconstructed by the unit of the block or the picture.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation, and do not intend to limit technical scopes of the present invention. Therefore, the scope of the invention should be defined by the appended claims.

When the above-described embodiments are implemented in software in the present invention, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for decoding a 3D video by a video decoding apparatus, the method comprising:
    obtaining, by the video decoding apparatus, a disparity value based on an index representing a reference view and a predetermined value;
    deriving, by the video decoding apparatus, motion information of a block in an inter-view reference picture in the reference view based on the disparity value, wherein the block in the inter-view reference picture in the reference view is a block related with a current block in a depth picture in a current view;
    deriving, by the video decoding apparatus, motion information of the current block in the depth picture in the current view based on the motion information of the block related with the current block; and
    generating, by the video decoding apparatus, a prediction sample of the current block based on the motion information of the current block,
    wherein the index representing the reference view is adaptively set equal to a view index of the inter-view reference picture in a reference picture list,
    wherein the reference view is the same as a view to which the inter-view reference picture comprising the block related with the current block belongs, and
    wherein the predetermined value is "1<<(bit depth−1)".

2. The method of claim 1, wherein the bit depth is a bit depth set for a luma sample.

3. A method for encoding a 3D video by a video encoding apparatus, the method comprising:
    obtaining, by the video encoding apparatus, a disparity value based on an index representing a reference view and a predetermined value;
    deriving, by the video encoding apparatus, motion information of a block in an inter-view reference picture in the reference view based on the disparity value, wherein the block in the inter-view reference picture in the reference view is a block related with a current block in a depth picture in a current view;

deriving, by the video encoding apparatus, motion information of the current block in the depth picture in the current view based on the motion information of the block related with the current block;

generating, by the video encoding apparatus, a prediction sample of the current block based on the motion information of the current block; and entropy encoding, by the video encoding apparatus, video information including residual signal of the current block and prediction mode information indicating a prediction mode of the current block, wherein the index representing the reference view is adaptively set equal to a view index of the inter-view reference picture in a reference picture list, wherein the reference view is the same as a view to which the inter-view reference picture comprising the block related with the current block belongs, and wherein the predetermined value is "1<<(bit depth−1)".

4. A non-transitory computer-readable storage medium storing video information, the video information, when executed, causing a video decoding apparatus to perform the following steps:

obtaining a disparity value based on an index representing a reference view and a predetermined value;

deriving motion information of a block in an inter-view reference picture in the reference view based on the disparity value, wherein the block in the inter-view reference picture in the reference view is a block related with a current block in a depth picture in a current view;

deriving motion information of the current block in the depth picture in the current view based on the motion information of the block related with the current block; and generating a prediction sample of the current block based on the motion information of the current block, wherein the index representing the reference view is adaptively set equal to a view index of the inter-view reference picture in a reference picture list, wherein the reference view is the same as a view to which the inter-view reference picture comprising the block related with the current block belongs, and wherein the predetermined value is "1<<(bit depth−1)".

* * * * *